US006839156B2

(12) United States Patent
Eom et al.

(10) Patent No.: US 6,839,156 B2
(45) Date of Patent: Jan. 4, 2005

(54) LASER SCANNING UNIT AND ELECTROPHOTOGRAPHIC IMAGE FORMING APPARATUS ADOPTING THE SAME

(75) Inventors: Yoon-seop Eom, Gyeonggi-do (KR); Min-ho Choi, Gyeonggi-do (KR); Seung-deog An, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/420,001

(22) Filed: Apr. 22, 2003

(65) Prior Publication Data

US 2004/0051771 A1 Mar. 18, 2004

(51) Int. Cl.[7] .............................................. G02B 26/08
(52) U.S. Cl. ...................... 359/203; 359/201; 359/204; 359/216; 347/115
(58) Field of Search .................. 347/115–118, 232, 347/134, 154; 359/196–201, 203–204, 216–218; 358/296; 355/52

(56) References Cited

U.S. PATENT DOCUMENTS

| | | | | |
|---|---|---|---|---|
| 3,646,568 A | * | 2/1972 | Woywood | 359/203 |
| 4,537,465 A | * | 8/1985 | Sherman et al. | 359/203 |
| 5,291,223 A | * | 3/1994 | Ogane | 347/116 |
| 5,359,407 A | * | 10/1994 | Suzuki et al. | 359/203 |
| 6,052,211 A | * | 4/2000 | Nakajima | 359/204 |
| 6,055,083 A | * | 4/2000 | Eom | 359/203 |
| 6,222,663 B1 | * | 4/2001 | Plotkin et al. | 359/216 |
| 2001/0035943 A1 | * | 11/2001 | Kato | 355/52 |
| 2003/0156310 A1 | * | 8/2003 | Suzuki et al. | 359/196 |

FOREIGN PATENT DOCUMENTS

KR    1997-036548    7/1997

OTHER PUBLICATIONS

Notice to Submit Response.
Korean Office Action, dated Jul. 27, 2004.

* cited by examiner

Primary Examiner—Eugene H. Eickholt
(74) Attorney, Agent, or Firm—Staas & Halsey LLP

(57) ABSTRACT

A laser scanning unit and an electrophotographic image forming apparatus adopting the same include a plurality of photogenerators emitting parallel lights, a plurality of rotatable polygonal mirrors which deflect the lights emitted from the photogenerators in a main scanning direction having a range of a predetermined angle to scan the lights onto photosensitive media proceeding in a sub scanning direction, the rotatable polygonal mirrors stacked on a driving unit to match corresponding ones of the photogenerators and coupled with a rotation shaft of the driving unit to rotate therewith, a plurality of first lenses which are installed in light paths between the photogenerators and the rotatable polygonal mirrors, respectively, and collect the lights in the sub scanning direction, and a plurality of second lenses which collect the lights deflected by the rotatable polygonal mirrors on corresponding ones of the photosensitive media.

40 Claims, 8 Drawing Sheets

LASER SCANNING UNIT AND ELECTROPHOTOGRAPHIC IMAGE FORMING APPARATUS ADOPTING THE SAME

CROSS-REFERENCE TO RELATED APPLICATIONS

This application claims the priority of Korean Patent Application No. 2002-56225 filed on Sep. 16, 2002, in the Korean Intellectual Property Office, the disclosure of which is incorporated herein in its entirety by reference.

BACKGROUND OF THE INVENTION

1. Field of the Invention

The present invention relates to a laser scanning unit and an electrophotographic image forming apparatus adopting the same, and more particularly, to a laser scanning unit having a plurality of rotatable polygonal mirrors actuated by one driving unit, and an electrophotographic image forming apparatus adopting the same.

2. Description of the Related Art

FIG. 1 is a cross-sectional view of a conventional color electrophotographic image forming apparatus. As shown in FIG. 1, a charger 15, a plurality of laser scanning units 30, a plurality of developing units 17, a transfer roller 21, and a fusing roller 22 are disposed around a photoreceptor web 14, which is supported by three rollers 11, 12, and 13 to circulate along an endless (closed) path.

In the above structure, if light emitted from the laser scanning units 30 is scanned onto the photoreceptor web 14, which is uniformly charged to a predetermined electrostatic potential by the charger 15, an electrostatic latent image corresponding to image information is formed by a relative electrostatic potential difference between a first portion where the light emitted from the laser scanning units 30 is scanned, and a second portion where the light emitted from the laser scanning units 30 is not scanned. Then, toner is supplied to the electrostatic latent image from the developing units 17 to form a toner image. A print of the toner image formed on the photoreceptor web 14 is completed by transferring the toner image to the transfer roller 21 rotating while being in contact with the photoreceptor web 14, and then transferring the toner image from the transfer roller 21 to a sheet of print paper S inserted between the transfer roller 21 and the fusing roller 22 pressing the print paper S against the transfer roller 21 so that the toner image is fixed to the printer paper S by heat and pressure.

FIG. 2 is a perspective view showing an example of a laser scanning unit used in the conventional color electrophotographic image forming apparatus presented in FIG. 1. As shown in FIGS. 1 and 2, each of the laser scanning units 30 includes a photogenerator 31, a rotatable polygonal mirror 32, a lens unit 33, and a motor 36. The rotatable polygonal mirror 32 is provided with a plurality of reflecting surfaces and coupled with a rotation shaft of the motor 36 rotating the rotatable polygonal mirror 32. The light, which is emitted from the photogenerator 31 and is incident onto the reflecting surfaces of the rotatable polygonal mirror 32, is deflected in a main scanning direction M due to a rotation of the rotatable polygonal mirror 32, and the deflected light is incident onto the photoreceptor web 14 via the lens unit 33.

In order to form a color image, the four laser scanning units 30 are required to respectively scan electrostatic latent images corresponding to four colors (yellow, magenta, cyan, and black) onto the photoreceptor web 14. Further, a synchronous detecting unit 34 matching synchronization between the light scanned onto the photoreceptor web 14 in the main scanning direction M and a motor driver 37 controlling a rotation of the motor 36 is required to control individual scanning operations of the respective laser scanning units 30. The synchronous detecting unit 34 and the motor driver 37 are controlled together by a system control unit 35.

In a case where the image forming apparatus has the four laser scanning units 30 as described above, a size of the image forming apparatus must become large. Thus, such a large image forming apparatus is difficult to satisfy a recent trend toward a small and light apparatus. Further, since each of the laser scanning units 30 has the lens unit 33 and the motor driver 37, costs of components for the laser scanning units 30 and an assembly cost thereof also increase. Further, a color registration error may be generated by control errors of the respective motor 36.

In order to solve the above-described problems, as shown in FIG. 3, there is proposed to install a plurality of reflecting mirrors 43 in the four laser scanning units 30 such that a plurality of photogenerators 42 emit lights onto one rotatable polygonal mirror 41 in different directions and the emitted lights are scanned onto photoreceptor media 44 through different light paths, respectively.

However, since the reflecting mirrors 43 must be used in the above-proposed method, the reflecting mirrors 43 must be disposed not to block the light paths of the lights emitted from the photogenerators 42. Thus, there is a limitation to install the reflecting mirrors 43 in a narrow space of the four laser scanning units 30 while satisfying the above condition. As a result, the size of the image forming apparatus must become large. Further, in a case where an angular error occurs in the light paths when the reflecting mirrors 43 are installed, the light path deviates twice as much as the angular error of an installation angle of the reflecting mirrors 43, thereby causing the color registration error of the color image. Accordingly, a great amount of time is required for accurately assembling and adjusting the reflecting mirrors 43, thereby increasing the assembly cost thereof.

SUMMARY OF THE INVENTION

The present invention provides an improved laser scanning unit capable of integrating a plurality of laser scanning units into only a single body to form a color image, and an electrophotographic image forming apparatus adopting the same.

Additional aspects and advantages of the invention will be set forth in part in the description which follows and, in part, will be obvious from the description, or may be learned by practice of the invention.

According to an aspect of the present invention, a laser scanning unit for an electrophotographic image forming apparatus includes a plurality of photosensitive media, a driving unit having a rotation shaft, a plurality of photogenerators emitting parallel lights (light or laser beams), a plurality of rotatable polygonal mirrors which deflect (reflect) the lights emitted from the photogenerators in a main scanning direction having a range of a predetermined angle to scan the lights onto corresponding ones of the photosensitive media proceeding (moving) in a sub scanning direction, the rotatable polygonal mirrors stacked on the driving unit to match corresponding ones of the photogenerators and coupled with a rotation shaft of the driving unit to rotate therewith, a plurality of first lenses which are installed in light paths of the lights between the photogenerators and the rotatable polygonal mirrors, respectively, and collect the lights in the sub scanning direction, and a plurality of second lenses which collect the lights deflected by the rotatable polygonal mirrors on the photosensitive media.

In the laser scanning unit, the first lenses and the second lenses may be integrated into a single body, respectively. Also, reflecting surfaces of the rotatable polygonal mirrors may be inclined with respect to the sub scanning direction.

According to another aspect of the present invention, an electrophotographic image forming apparatus includes a photosensitive medium, a laser scanning unit scanning light onto the photosensitive medium to form an electrostatic latent image, a plurality of developing units supplying toner to the electrostatic latent image to form toner images, a transfer unit transferring the toner images to a sheet of print paper, and a fixing unit fixing the toner images on the print paper.

The laser scanning unit includes a plurality of photogenerators emitting parallel lights, a plurality of rotatable polygonal mirrors which deflect the lights emitted from the photogenerators in a main scanning direction within a range having a predetermined angle to scan the lights onto photosensitive media proceeding in a sub scanning direction, the rotatable polygonal mirrors stacked on a driving unit to match respective ones of the photogenerators and coupled with a rotation shaft of the driving unit to rotate therewith, a plurality of first lenses which are disposed on light paths between the photogenerators and the rotatable polygonal mirrors, respectively, and collect the lights in the sub scanning direction, and a plurality of second lenses which collect the lights deflected by the rotatable polygonal mirrors on corresponding ones of the photosensitive media.

In the electrophotographic image forming apparatus, the photosensitive medium may include the same number of photoreceptor drums as the number of the photogenerators. Also, the photosensitive medium may include a photoreceptor web circulating along an endless (closed) path.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
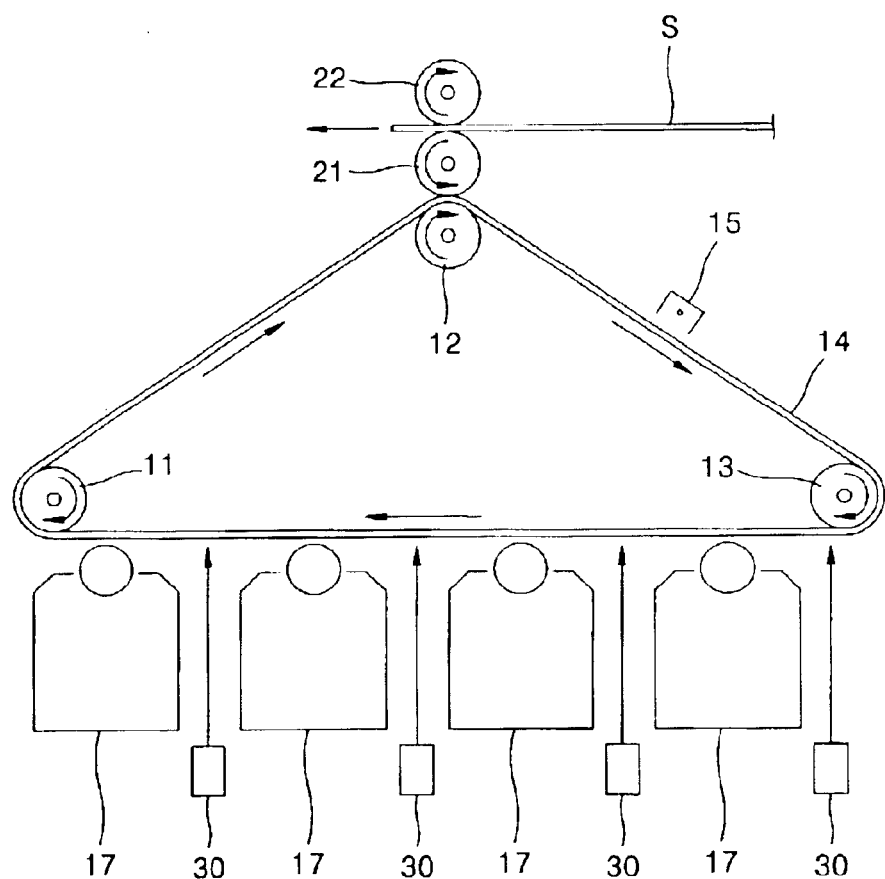
FIG. 1 is a cross-sectional view of a conventional color electrophotographic image forming apparatus.
Figure 2:
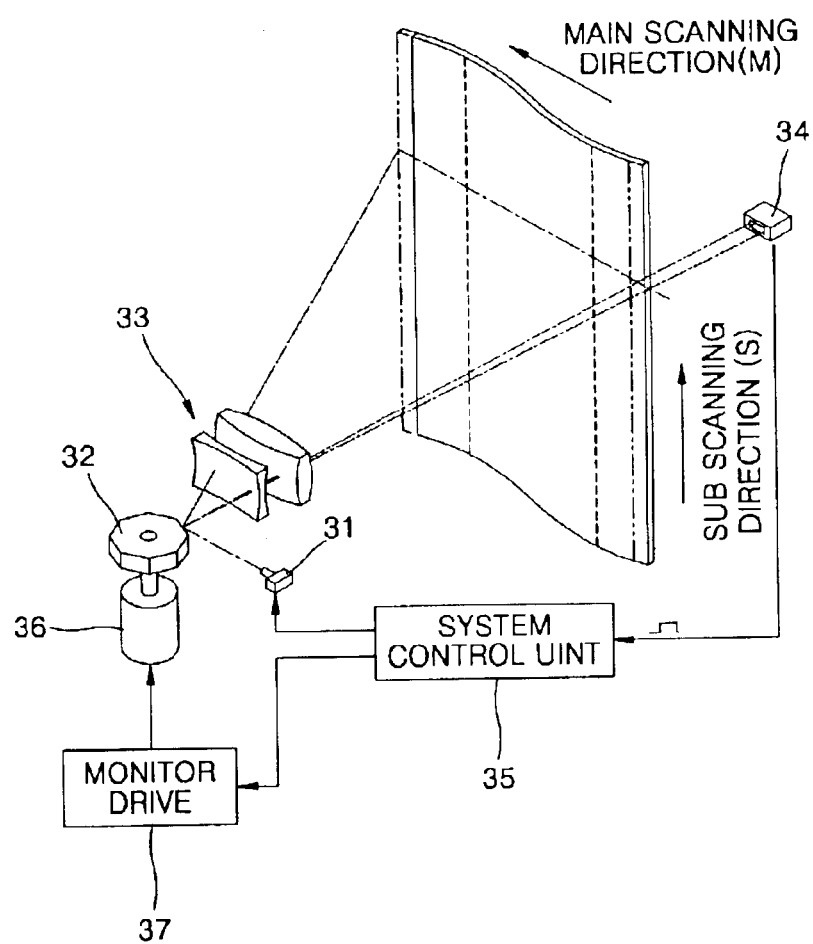
FIG. 2 is a perspective view showing an example of a conventional laser scanning unit of the conventional color electrophotographic image forming apparatus shown in FIG. 1.
Figure 3:
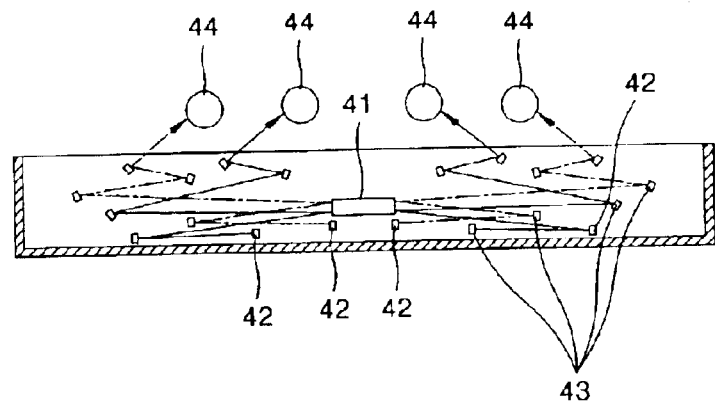
FIG. 3 is a cross-sectional view showing another example of the conventional laser scanning unit of the conventional color electrophotographic image forming apparatus shown in FIG. 1.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

The embodiments described below relate to a laser scanning unit for a color image by emitting four lights (four light beams or four laser beams) corresponding to four colors (black (K), cyan (C), magenta (M), yellow (W)).

Figure 4:
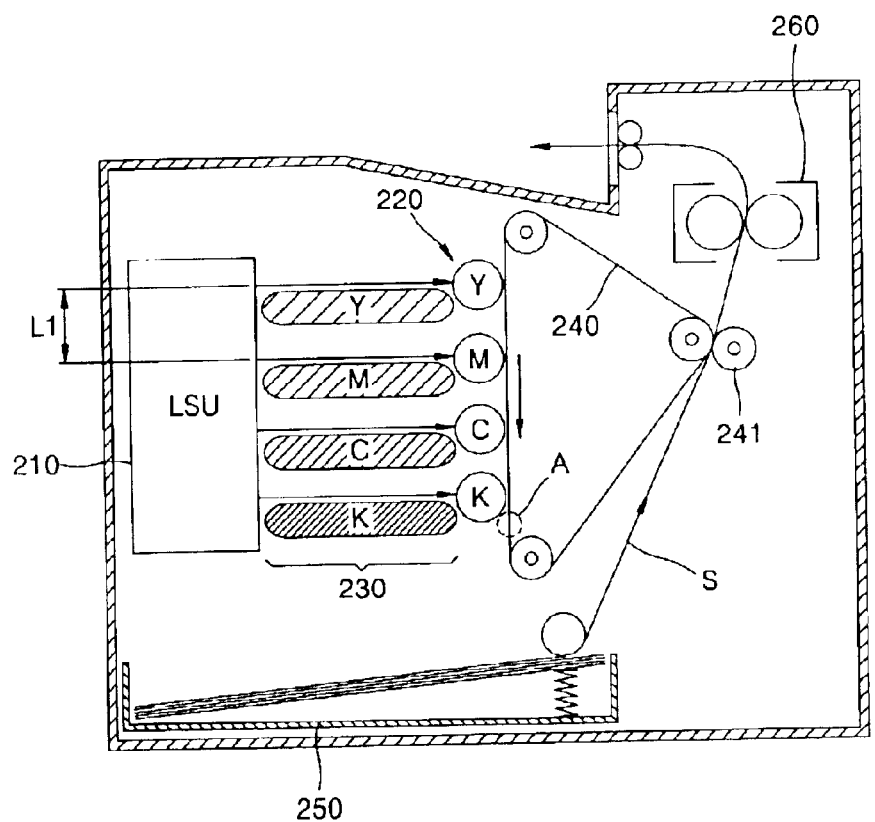
FIG. 4 is a cross-sectional view showing an electrophotographic image forming apparatus according to an embodiment of the present invention.

FIG. 4 is a cross-sectional view showing a first embodiment of an electrophotographic image forming apparatus according to the present invention.

As shown in FIG. 4, an image forming apparatus includes a laser scanning unit 210, four photoreceptor drums 220 (220-Y, 220-M, 220-C, and 220-K), four developing units 230 (230-Y, 230-M, 230-C, and 230-K), a transfer unit having a transfer belt 240, and a fixed unit 260. The laser scanning unit 210 scans lights (light beams or laser beams) onto corresponding ones of the four photoreceptor drums 220, which are uniformly charged to a predetermined electrostatic potential, to form electrostatic latent images. The four developing units 230 develop the electrostatic latent images with four color toners, i.e., black (K), cyan (C), magenta (M), and yellow (W) toners, to form toner images. After the toner images of the four colors toners formed on corresponding ones of the four photoreceptor drums 220 are transferred to the transfer belt 240 to be superimposed sequentially to form a full color image, the transfer belt 240 transfers the toner images (full color image) to a sheet of print paper S. The fixed unit 260 heats and presses the print paper S, to which the toner images are transferred, to fix the toner images on the print paper S. Generally, a feeding cassette 250 supplying the print paper S is installed in a main body of the image forming apparatus.

In the above structure, the color image formation is processed as follows. Firstly, if the four photoreceptor drums 220 are uniformly charged to the predetermined electrostatic potential by a charger (not shown), the laser scanning unit 210 scans one of the lights onto a corresponding one of the photoreceptor drums 220 to form a first electrostatic latent image corresponding to a first color to be developed. For example, if yellow (Y) is determined as the first color, the developing unit 230Y corresponding to the yellow (Y) develops the first electrostatic latent image formed on the photoreceptor drum 220Y corresponding to the yellow (Y) with a yellow (Y) toner, thereby forming a yellow (Y) image. The yellow (Y) image thus formed is then transferred to the transfer belt 240 from the photoreceptor drum 220Y.

Next, a second electrostatic latent image corresponding to a second color to be developed is formed by the charger and the laser scanning unit 210 charging and exposing another one of the photoreceptor drums 220, respectively. For example, if magenta (M) is determined as the second color, the developing unit 230M corresponding to the magenta (M) develops the second electrostatic latent image formed on the photoreceptor drum 220M corresponding to the magenta (M) with a magenta (M) toner, thereby forming a magenta (M) image. The magenta (M) image is superimposed with the yellow (Y) image when being transferred to the transfer belt 240, to which the yellow (Y) image has been transferred. At this time, an exposure of the laser scanning unit 210, a rotation of the photoreceptor drum 220, and a movement speed of the transfer belt 240 are precisely controlled so that the yellow (Y) image and the magenta (M) image are superimposed and accurately transferred.

A cyan (C) image of cyan, a third color, and a black (K) image of black, a fourth color, are developed and transferred sequentially using the above-described method, and thereafter the full color image is formed at a position A of the transfer belt 240 as shown in FIG. 4. The full color image is transferred to the print paper S which is supplied between the transfer belt 240 and a transfer back-up roller 241 from the feeding cassette 250, and the print paper S is heated and pressed when passing through the fixed unit 260 so that the full color image is completely fixed on the print paper S.

Figure 5:
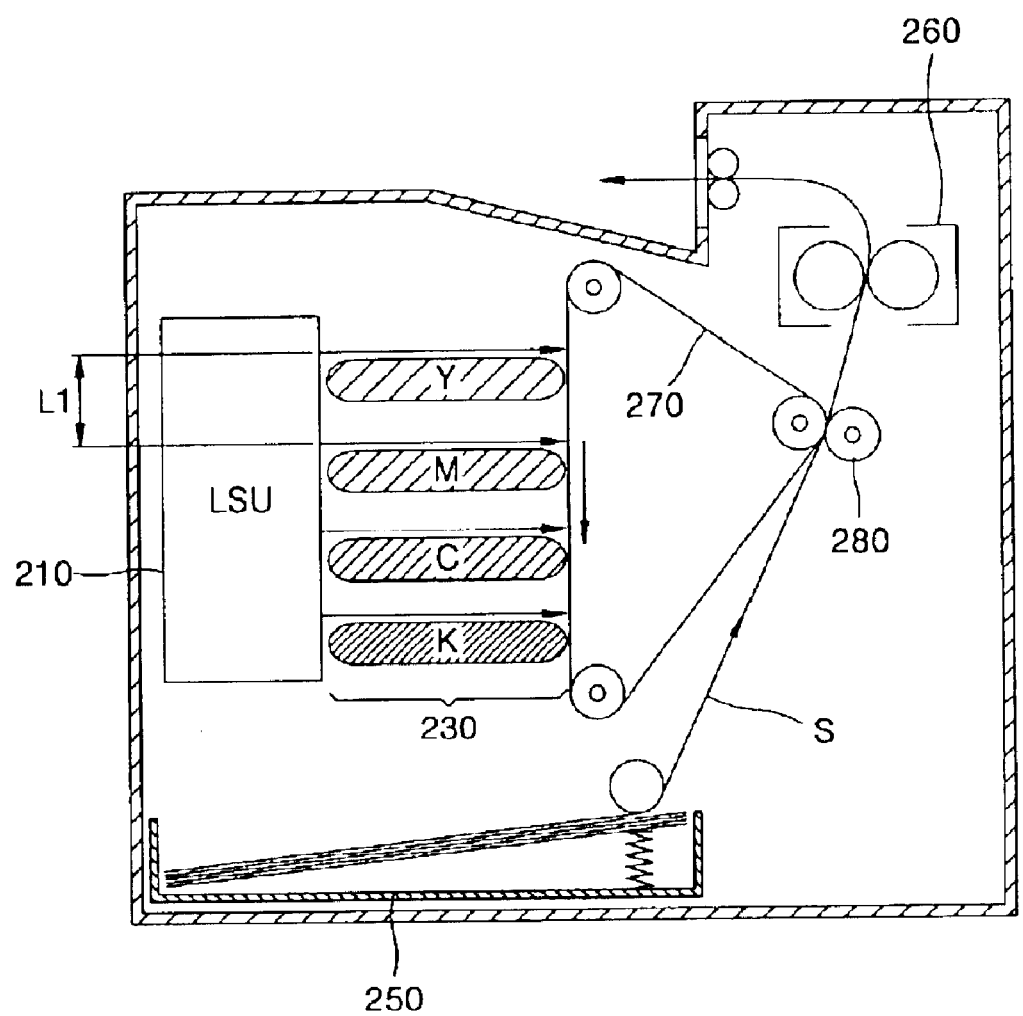
FIG. 5 is a cross-sectional view showing another electrophotographic image forming apparatus according to another embodiment of the present invention.

Although the four photoreceptor drums 220Y, 220M, 220C, and 220K are used as a photosensitive medium, and the transfer belt 240 is used as a transfer unit in this embodiment shown in FIG. 4, it is possible that a photoreceptor web 270 circulating along an endless (closed) path is used as the photosensitive medium, and that a transfer roller 280 is used as the transfer-unit as shown in FIG. 5 in which another image forming apparatus is presented according to another embodiment of the present invention. In the above image formation of FIG. 5, the toner images of the four colors, for example, the yellow (Y), the magenta (M), the cyan (C), and the black (K) are sequentially superimposed in this order by the developing units 230 to form the full color image, and then the superimposed color toner images (full color image) are formed on the photoreceptor web 270. Next, the color toner image is transferred to the print paper S, which is supplied between the photoreceptor web 270 and the transfer roller 280, and then is fixed on the print paper S by passing through the fixed unit 260, whereby a color image print is completed.

The electrophotographic image forming apparatus according to the present invention is characterized in that the laser scanning unit 210 has a plurality of rotatable polygonal mirrors being rotated by only one driving motor, which is different from a conventional image forming apparatus including four laser scanning units.

Figure 6:
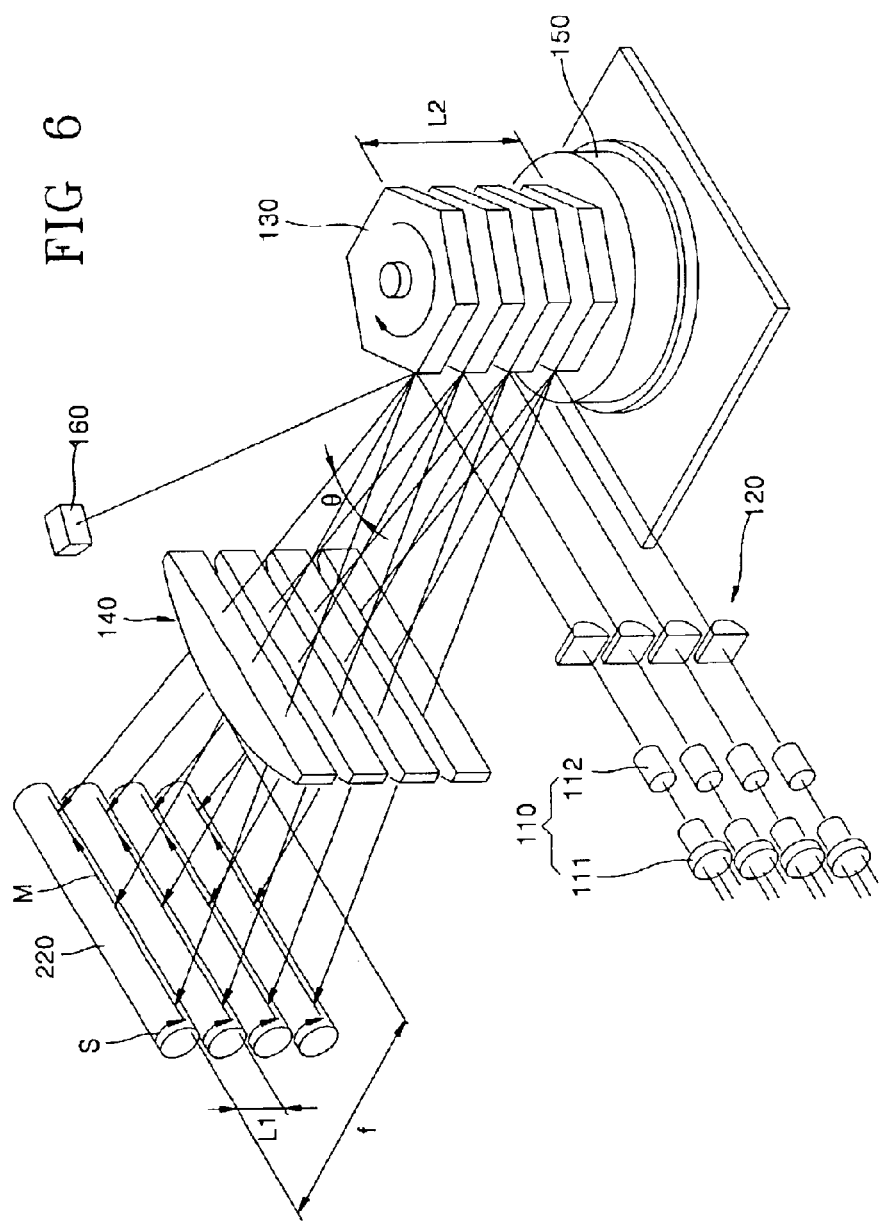
FIG. 6 is a perspective view showing an example of a laser scanning unit adopted in the electrophotographic image forming apparatuses of FIGS. 4 and 5.
Figure 7:
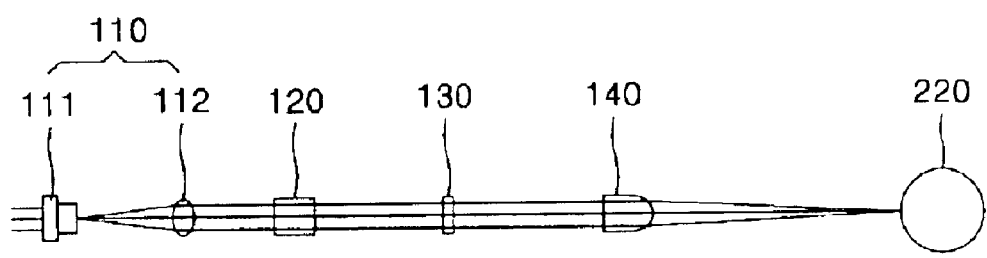
FIGS. 7 and 8 are image formation views in a main scanning direction and a sub scanning direction by the laser scanning unit of FIG. 6.
Figure 8:
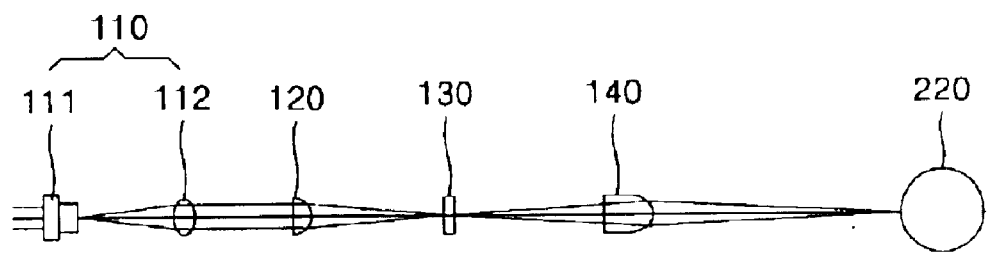

FIG. 6 is a perspective view of an example of the laser scanning unit 210 adopted in the electrophotographic image forming apparatuses of FIGS. 4 and 5. FIGS. 7 and 8 are views showing image formation in a main scanning direction and a sub scanning direction by the laser scanning unit 210 of FIG. 6. The main scanning direction represents a direction in which each light is scanned on the corresponding photoreceptor drum 220, and the sub scanning direction represents a direction in which the lights are arranged or scanning lines formed on the respective photoreceptors drum 220 are disposed.

The laser scanning unit shown in FIG. 6 includes photogenerators 110 emitting parallel lights (light beams or laser beams), first lenses 120 collecting the lights in the sub scanning direction, rotatable polygonal mirrors 130 deflecting the lights in the main scanning direction, and second lenses 140 which collect the lights deflected by the rotatable polygonal mirrors 130 on surfaces of photosensitive media, i.e., scanned objects. The photogenerators 110, the first lenses 120, the rotatable polygonal mirrors 130, and the second lenses 140 are four in number to correspond to the four colors of the yellow (Y), the magenta (M), the cyan (C), and the black (K), respectively, and are arranged in the sub scanning direction. In the present embodiment shown in FIG. 6, the photoreceptor drum 220 is used as a photosensitive medium.

The photogenerators 110 each include a light source 111 and a collimate lens 112. A laser diode emitting monochromatic light is generally used as the light source 111. Since the light emitted from the light source 111 is diverging light (light beam or laser beam), the diverging light is changed into parallel light (light beam or laser beam) by passing through the collimate lens 112. As presented in FIGS. 7 and 8, a cylindrical lens is generally used as the first lens 120 so that the parallel light emitted from the photogenerator 110 is collected in the sub scanning direction and is incident on the rotatable polygonal mirror 130.

The four rotatable polygonal mirrors 130 are stacked along a rotating shaft of a driving motor 150 in the sub scanning direction. Thus, when the driving motor 150 rotates, the four rotatable polygonal mirrors 130 rotate simultaneously. In general, at least one reflecting surface is formed on each of the rotatable polygonal mirrors 130. In the present embodiment shown in FIG. 6, six reflecting surfaces are formed on each of the rotatable polygonal mirrors 130. As the rotatable polygonal mirrors 130 rotate, an angle between the lights incident on the reflecting surfaces of the rotatable polygonal mirrors 130 from the photoreceptors 110 and the reflecting surfaces of the rotatable polygonal mirrors 130 is continuously changed, so that the lights reflected from the rotatable polygonal mirror 130 are deflected in the main scanning direction and proceed toward the photoreceptor drum 220. As described above, since the four rotatable polygonal mirrors 130 rotate by only one driving motor 150, the laser scanning unit 210 according to the present invention may have only one motor driver (not shown), which is different from the conventional laser scanning unit having four motor drivers driving the four driving motors.

Each of the second lenses 140 is installed between the photoreceptor drums 220 and the rotatable polygonal mirrors 130. An aspheric lens, which is normally referred to as an f-θ lens, is used as the second lens 140. The second lenses 140 make the lights deflected by the rotatable polygonal mirrors 130 collect on surfaces of the photoreceptor drums 220, as shown in FIGS. 7 and 8. As the lights deflected by the rotatable polygonal mirrors 130 pass through the second lenses 140, the deflected lights form images (scanning lines) on the photoreceptor drums 220 located at a focal distance f irrespective to an deflection angle θ.

A synchronous detecting unit 160 detects synchronization between the lights scanned onto the photoreceptor drums 220 in the main scanning direction to determine an instant of time when scanning of respective lights begins. That is, after the synchronous detecting unit 160 detects the light and a predetermined time elapses, the light corresponding to the image information begins to be scanned so that the light is accurately scanned when the scanning of the light begins. Four synchronous detecting units 160 may be installed, but only one synchronous detecting unit may be installed in a case where the reflecting surfaces of the rotatable polygonal mirrors 130 of the laser scanning unit are assembled to be accurately identified (arranged) in the sub scanning direction.

Figure 9:
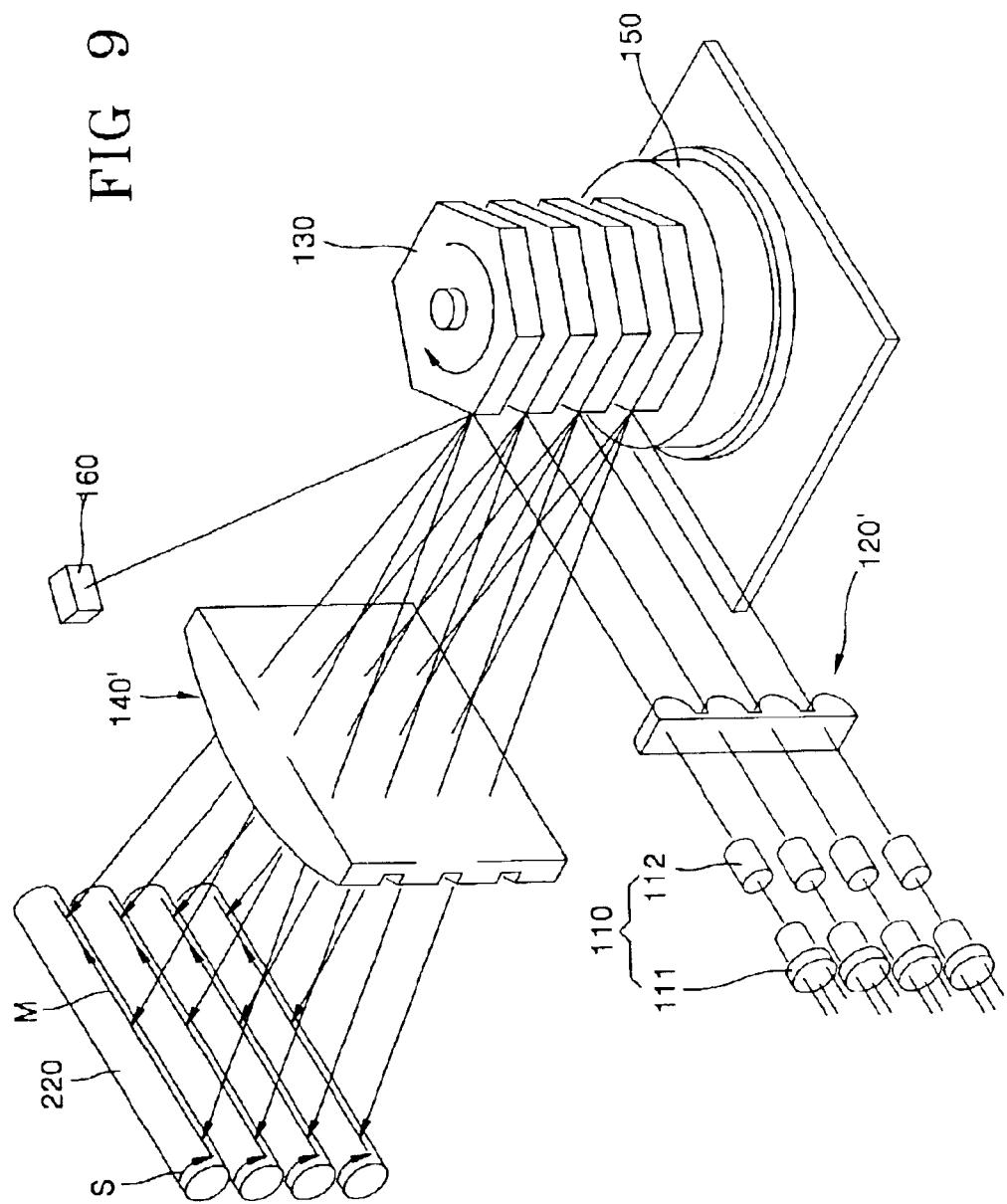
FIG. 9 is a perspective view showing another example of the laser scanning unit adopted in the electrophotographic image forming apparatuses of FIGS. 4 and 5.

FIG. 9 is a perspective view of another example of the laser scanning unit 210 shown in FIGS. 4 and 5.

The laser scanning unit 210 shown in FIG. 9 includes a first lens 120' and a second lens 140' which are obtained by integrating the four first lenses 120 and the four second lenses 140 shown in FIG. 6 into a single body, respectively. Recently, as technologies for manufacturing optical devices are continuously improved, a conventional method of manufacturing optical lenses by cutting optical materials, such as glass, etc., has been replaced with an injection molding method using optical materials, such as transparent plastic. By this technology, it is possible to integrate the four first lenses 120 and the four second lenses 140 arranged in the sub scanning direction of FIG. 6 into the single body, respectively. At this time, it is possible to form the cylindrical lens and the f-θ lens on only portions where the light penetrates. Thus, a manufacturing cost and an assembly cost of components of the laser scanning unit 210 are greatly reduced compared to a case where the first and second lenses are manufactured individually as in the related art.

According to the examples of the laser scanning unit shown in FIGS. 6 and 9, the parallel lights emitted from the photogenerators 110 are collected to be arranged in the sub scanning direction by the first lens 120 or 120' so that the parallel lights are incident on the corresponding rotatable polygonal mirrors 130. As the rotatable polygonal mirrors 130 rotate, the lights reflected from the reflecting surfaces of the rotatable polygonal mirrors 130 are deflected in the main scanning direction having a range of a predetermined angle. Then, the deflected lights are collected to be arranged in the sub scanning direction and the main scanning direction by the second lens 140 or 140' so that the collected lights are scanned onto the corresponding surfaces of the photoreceptor drums 220.

The toner images corresponding to the four colors accurately overlap to form the color image. This is referred to as color registration. It is possible that a space (interval) L1 (see FIG. 6) between the lights incident on the photosensitive medium is an integer multiple of a resolution of the color image to easily perform the color registration. That is, as shown in FIGS. 4 and 5, it is possible that the space L1 between main scanning lines formed on the-photoreceptor drum 220 or the photoreceptor web 270 by the corresponding lights is the integer multiple of the resolution of the color image in the sub scanning direction. Thus, since each of elements of the image forming apparatus is controlled by a unit of the integer multiple of the resolution in controlling the image forming apparatus, it is easy to perform the color registration. The rotatable polygonal mirrors 130 have another space (interval) L2 corresponding to spaces (intervals) L1 of the lights incident on the photosensitive drums 220 or corresponding to a distance between optical paths of the lights of the laser scanning unit 210 as shown in FIG. 6.

Also, in the image forming apparatus shown in FIG. 4 in which the photoreceptor drums 220 are used as the photosensitive medium, if the space between the lights incident on the photoreceptor drums 220 is the integer multiple of a circumference length of the photoreceptor drums 220, it is easy to perform the color registration. For example, after the light is scanned onto the photoreceptor drum 220Y so that the photoreceptor drum 220Y rotates one time, the light begins to be scanned onto the photoreceptor drum 220Y so that the yellow toner image and the magenta toner image accurately overlap, and the overlapped toner images are transferred to the photoreceptor web 240, whereby the color registration is identified.

The image forming apparatus having a very compact structure can be embodied by adopting the laser scanning unit 210 according to the present invention, making a size of the photoreceptor drum small, for example, 20 mm or less, and causing the light to be incident on the photosensitive medium through spaces between the developing units.

Figure 10:
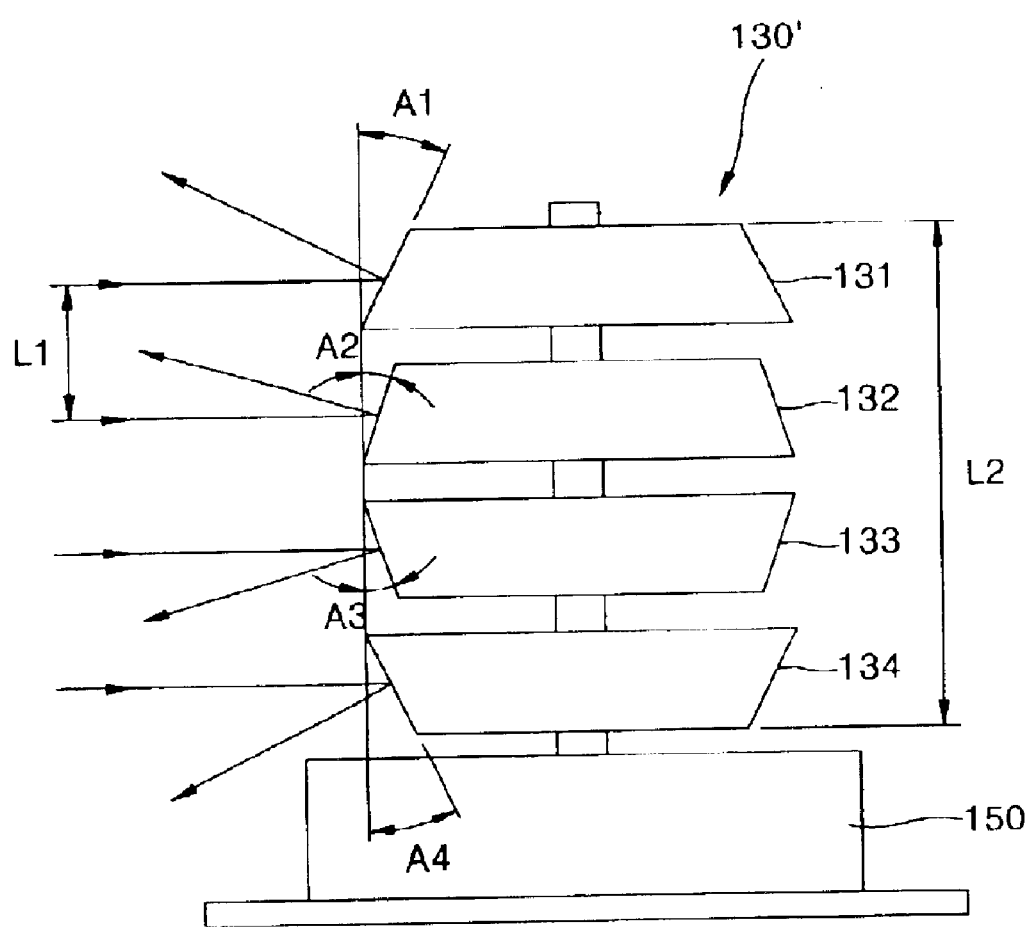
FIG. 10 is a perspective view showing a third example of the laser scanning unit adopted in the electrophotographic image forming apparatuses of FIGS. 4 and 5.

FIG. 10 is a perspective view of another example of the laser scanning unit 210.

With reference to FIG. 10, respective reflecting surfaces 131, 132, 133, and 134 of four rotatable polygonal mirrors 130' are formed to be inclined with respect to the sub scanning direction. The respective reflecting surfaces 131, 132, 133, and 134 may be formed to have different angles A1, A2, A3, and A4 with respect to a line corresponding to the sub scanning direction. The angle A1 may be equal to the angle A4, and the angle A2 may be equal to the angle A3. It is possible that various changes in forms of the respective reflecting surfaces 131, 132, 133, and 134 may be made. By this structure of four rotatable polygonal mirrors 130', the lights are deflected not only in the main scanning direction but also in the sub scanning direction via corresponding ones of the four rotatable polygonal mirrors 130' at twice the inclined angles A1, A2, A3, and A4 since the inclined angles A1 and A2 are formed in different directions from the inclined angles A3 and A4 as shown in FIG. 10. Thus, when a space between the main scanning lines formed on the photosensitive medium 220 or 270 is maintained constant by adjusting the inclined angles A1, A2, A3, and A4, an overall height of the four rotatable polygonal mirrors 130' installed on the driving motor 150 can be reduced so that the four rotatable polygonal mirrors 130' can rotate stably.

As described above, the laser scanning unit according to the present invention and the image forming apparatus adopting the laser scanning unit have the following advantages.

First, since the rotatable polygonal mirrors are installed on one driving motor, the component cost can be reduced compared to the conventional laser scanning unit in which the rotatable polygonal mirrors are installed on a plurality of driving motors.

Second, since the first collecting lenses and the second collecting lenses are integrated into a single body, respectively, and only one synchronization detecting unit is needed, the manufacturing cost and the assembly cost of the components can be reduced.

Third, since the rotatable polygonal mirrors are installed on one driving motor, a color registration error generated by the control errors of the respective driving motors in the conventional laser scanning unit does not occur in the laser scanning unit of the present invention.

Fourth, since the laser scanning units are integrated into a single body, the size of the image forming apparatus can be reduced.

While the present invention has been particularly shown and described with reference to preferred embodiments thereof, it will be understood by those of ordinary skill in the art that various changes in form and details may be made therein without departing from the spirit and scope of the present invention as defined by the appended claims and their equivalents.

What is claimed is:

1. A laser scanning unit for an electrophotographic image forming apparatus comprising:
   a plurality of photosensitive media;
   a driving unit having a rotation shaft;
   a plurality of photogenerators emitting parallel beams;
   a plurality of rotatable polygonal mirrors which deflect the beams emitted from the photogenerators in a main scanning direction having a range of a predetermined angle to scan the beams onto corresponding ones of the photosensitive media proceeding in a sub scanning direction, the rotatable polygonal mirrors stacked on the driving unit to match corresponding ones of the photogenerators and coupled with the rotation shaft of the driving unit to rotate therewith;

a plurality of first lenses which are installed in light paths of the beams between the photogenerators and the rotatable polygonal mirrors, respectively, and collect the beams in the sub scanning direction; and a plurality of second lenses which collect the beams deflected by corresponding ones of the rotatable polygonal mirrors on corresponding ones of the photosensitive media.

2. The laser scanning unit of claim 1, wherein the first lenses are integrated into a single body.

3. The laser scanning unit of claim 1, wherein the second lenses are integrated into a single body.

4. The laser scanning unit of claim 1, wherein the rotatable polygonal mirrors comprise:

reflecting surfaces inclined in the sub scanning direction.

5. An electrophotographic image forming apparatus comprising:

a photosensitive medium;

a laser scanning unit scanning beams onto the photosensitive medium to form a plurality of electrostatic latent images;

a plurality of developing units supplying toners to the electrostatic latent images to form toner images on to the photosensitive medium;

a transfer unit transferring the toner images to a sheet of print paper to form a color image; and a fixed unit fixing the color image on the print paper, wherein the laser scanning unit comprises, a driving unit having a rotation shaft;

a plurality of photogenerators emitting the beams parallel to each other;

a plurality of rotatable polygonal mirrors which deflect the beams emitted from the photogenerators in a main scanning direction having a range of a predetermined angle to scan the beams onto the photosensitive medium proceeding in a sub scanning direction, the rotatable polygonal mirrors stacked on the driving unit to match corresponding ones of the photogenerators and coupled with the rotation shaft of the driving unit to rotate therewith;

a plurality of first lenses which are installed on light paths of the beams between the photogenerators and the rotatable polygonal mirrors, respectively, and collect the beams in the sub scanning direction; and a plurality of second lenses which collect the beams deflected by the rotatable polygonal mirrors on the photosensitive medium.

6. The electrophotographic image forming apparatus of claim 5, wherein the first lenses are integrated into a single body.

7. The electrophotographic image forming apparatus of claim 5, wherein the second lenses are integrated into a single body.

8. The electrophotographic image forming apparatus of claim 5, wherein the rotatable polygonal mirrors comprise:

reflecting surfaces inclined in the sub scanning direction.

9. The electrophotographic image forming apparatus of claim 5, wherein the photosensitive medium comprises:

photoreceptor drums having the same number as the photogenerators.

10. The electrophotographic image forming apparatus of claim 9, wherein a space is formed between the lights which are scanned onto the photoreceptor drums in the sub scanning direction, and a size of the space is an integer multiple of a circumference length of the photoreceptor drums.

11. The electrophotographic image forming apparatus of claim 9, wherein a space is formed between the lights which are scanned onto the photoreceptor drums in the sub scanning direction, and a size of the space is an integer multiple of a resolution of the color image in the sub scanning direction of the photoreceptor drums.

12. The electrophotographic image forming apparatus of claim 5, wherein the photosensitive medium comprises:

a photoreceptor web circulating along an endless path.

13. The electrophotographic image forming apparatus of claim 12, wherein a space is formed between the lights which are scanned onto the photoreceptor web in the sub scanning direction by the photogenerators, and a size of the space is an integer multiple of a resolution of the color image in the sub scanning direction of the photoreceptor web.

14. A laser scanning unit for an electrophotographic image forming apparatus comprising:

a plurality of photogenerators arranged in a sub scanning direction to emit a plurality of beams along a plurality of optical paths disposed in the sub scanning direction, respectively;

a plurality of rotatable polygonal mirrors arranged in the sub scanning direction to rotate about a common axis parallel to the sub scanning direction, and deflecting the beams emitted from the photogenerators along respective optical paths in main scanning directions each having an angle with the sub scanning direction to form a plurality of scanning lines which are spaced-apart from each other in the sub scanning direction, respectively.

15. The laser scanning unit of claim 14, wherein the photogenerators comprise:

a plurality of light sources disposed in the sub scanning direction to emit the beams; and a plurality of collimating lens disposed on corresponding ones of the optical paths in the sub scanning direction to convert the beams into parallel beams in the sub scanning direction.

16. The laser scanning unit of claim 14, further comprising:

a plurality of lenses which are disposed on corresponding ones of the optical paths of the beams between the photogenerators and the rotatable polygonal mirrors to collect the beams in the sub scanning direction.

17. The laser scanning unit of claim 16, wherein the lenses are made of a monolithic single body.

18. The laser scanning unit of claim 14, further comprising:

a photosensitive medium disposed to move in the sub scanning direction; and a plurality of lenses disposed between the photosensitive medium and the rotatable polygonal mirrors to collect the beams deflected by corresponding ones of the rotatable polygonal mirrors on the photosensitive medium to form the scanning lines.

19. The laser scanning unit of claim 14, further comprising:

a plurality of first lenses which are installed on corresponding ones of the optical paths of the beams between the photogenerators and the rotatable polygonal mirrors to collect the beams in the sub scanning direction; and a plurality of second lenses disposed to collect the beams deflected by corresponding ones of the rotatable polygonal mirrors in the sub scanning direction and the corresponding main scanning direction to form the scanning lines.

20. The laser scanning unit of claim 19, wherein the first lenses are formed of a monolithic single body, and the second lenses are formed of another monolithic single body.

21. The laser scanning unit of claim 14, further comprising:

a driving unit having a rotation shaft having the common axis, wherein the rotatable polygonal mirrors are coupled to the rotation shaft of the driving unit to rotate about the rotation shaft.

22. The laser scanning unit of claim 14, wherein each of the rotatable polygonal mirrors comprises:

reflecting surfaces disposed on the same plane on which a corresponding one of the optical paths is disposed.

23. The laser scanning unit of claim 14, wherein each of the rotatable polygonal mirrors comprises:

reflecting surfaces having an angle with respect to the sub scanning direction to direct the corresponding beams in the sub scanning direction and the corresponding main scanning direction.

24. The laser scanning unit of claim 23, wherein:

the beams comprise, first, second, third, and fourth beams; and the reflecting surfaces comprise, first, second, third, and fourth reflecting surfaces having first, second, third, and fourth angles, respectively, with respect to the line corresponding to the sub scanning direction.

25. The laser scanning unit of claim 24, wherein the first and second angels of the first and second reflecting surfaces are formed to reflect the first and second beams in a first direction, and the third and fourth angles of the third and fourth reflecting surfaces are formed to reflect the third and fourth beams in a second direction.

26. The laser scanning unit of claim 25, wherein the first and second directions are disposed opposite with respect to a line perpendicular to one of the common axis and the sub scanning line.

27. The laser scanning unit of claim 24, wherein the first and fourth angles have a first value, and the second and third angles have a second angle.

28. The laser scanning unit of claim 14, wherein the rotatable polygonal mirrors comprise:

reflecting surfaces having different angles with the sub scanning direction.

29. The laser scanning unit of claim 14, wherein the rotatable polygonal mirrors comprise:

reflecting surfaces corresponding to respective optical paths to direct the corresponding beams in the corresponding main scanning direction and the sub scanning direction.

30. The laser scanning unit of claim 14, wherein the rotatable polygonal mirrors are formed of a monolithic single body.

31. An electrophotographic image forming apparatus comprising:

a photosensitive medium;

a laser scanning unit generating beams to scan onto the photosensitive medium to form a plurality of electrostatic latent images on the photosensitive medium;

a plurality of developing units supplying toners to the electrostatic latent images to form toner images on the photosensitive medium;

a transfer unit transferring the toner images to a sheet of print paper to form a color image; and a fixed unit fixing the color image on the print paper, wherein the laser scanning unit comprises, a plurality of photogenerators arranged in a sub scanning direction to emit a plurality of beams along a plurality of optical paths disposed in the sub scanning direction, and a plurality of rotatable polygonal mirrors arranged in the sub scanning direction to rotate about a common axis parallel to the sub scanning direction, and deflecting the beams emitted from the photogenerators along respective optical paths in respective main scanning directions each having an angle with the sub scanning direction to form a plurality of scanning lines on the photosensitive medium in the sub scanning direction.

32. The electrophotographic image forming apparatus of claim 31, wherein the photosensitive medium comprises:

a plurality of photosensitive drums arranged in the sub scanning direction to correspond to respective rotatable polygonal mirrors and respective photogenerators.

33. The electrophotographic image forming apparatus of claim 31, wherein the laser scanning unit comprises:

a single motor rotating the rotatable polygonal mirrors.

34. The electrophotographic image forming apparatus of claim 33, wherein the single motor comprises:

a rotation shaft disposed on the common axis to be coupled to the rotatable polygonal mirrors.

35. The electrophotographic image forming apparatus of claim 33, wherein the rotatable polygonal mirrors are formed of a monolithic single body coupled to the rotation shaft.

36. The electrophotographic image forming apparatus of claim 33, further comprising:

a synchronous detecting unit detecting a portion of the beams to control the single motor.

37. The electrophotographic image forming apparatus of claim 33, wherein each of the rotatable polygonal mirrors comprises:

a reflective surface disposed on the corresponding optical paths to reflect the corresponding beam to form the corresponding scan line on a corresponding position of the photosensitive medium.

38. An electrophotographic image forming apparatus comprising:

a photosensitive medium;

a light source generating beams to scan onto the photosensitive medium along a light path to form a plurality of electrostatic latent images on the photosensitive medium;

a plurality of rotatable polygonal mirrors corresponding to respective ones of the beams to direct the beams toward the photosensitive medium to form corresponding ones of the electrostatic latent images on the photosensitive medium;

a first lens disposed between the light source and the rotatable polygonal mirrors, and having cylindrical lenses formed on portions where the beams penetrate; and a second lens disposed between the rotatable polygonal mirrors and the photosensitive medium, and having f-θ lenses formed on portions where the beams penetrate.

39. The electrophotographic image forming apparatus of claim 38, wherein the first lens comprises non-cylindrical lenses formed on other portions where the beams does not penetrate, and a plurality of sub-first lenses corresponding to the respective beams and having corresponding ones of the cylindrical lenses and the non-cylindrical lenses, the second lens comprises non-f-θ lenses formed on other portions where the beams do not penetrate, and wherein the cylindrical lenses and the non-cylindrical lenses are formed in a single monolithic body.

40. The electrophotographic image forming apparatus of claim 39, wherein the first lens comprises a plurality of sub-second lenses corresponding to the respective beams and having corresponding ones of the f-θ lenses and the non-f-θ lenses, and the cylindrical lenses and the non-cylindrical lenses are formed in a single monolithic body.

\* \* \* \* \*

UNITED STATES PATENT AND TRADEMARK OFFICE
CERTIFICATE OF CORRECTION

PATENT NO. : 6,839,156 B2
DATED : January 4, 2005
INVENTOR(S) : Yoon-seop Eom et al.

It is certified that error appears in the above-identified patent and that said Letters Patent is hereby corrected as shown below:

<u>Title page,</u>
Insert Item:
-- [30]   Foreign Application Priority Data

September 16, 2002  (KR)....10-20020056225 --.

<u>Column 11,</u>
Line 37, change "angels" to -- angles --.

Signed and Sealed this

Third Day of January, 2006

JON W. DUDAS
*Director of the United States Patent and Trademark Office*